United States Patent Office.

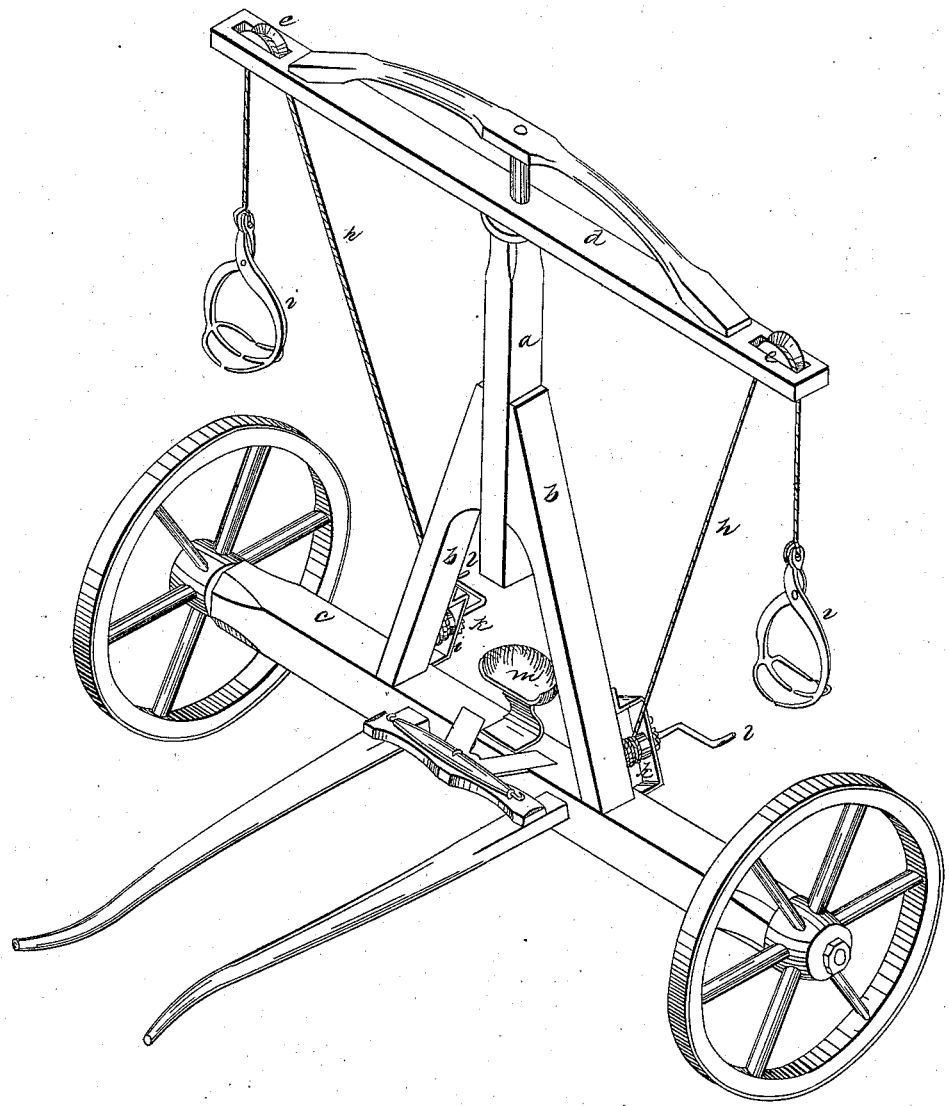

J. FORSHEE AND J. C. McCLAND, OF UNIONVILLE CENTRE, OHIO.

Letters Patent No. 70,189, dated October 29, 1867.

IMPROVEMENT IN HAY-STACKERS.

The Schedule referred to in these Letters Patent and making part of the same.

TO ALL WHOM IT MAY CONCERN:

Be it known that we, J. FORSHEE and J. C. McCLAND, of Unionville Centre, in the county of Union, and State of Ohio, have invented a new and improved Hay-Stacker; and we do hereby declare that the following is a full and exact description thereof, reference being had to the accompanying drawings, and to the letters of reference marked thereon.

This invention is intended for use in transferring hay from the cock to the stack. It consists of a derrick provided with suitable hay-elevating apparatus, and mounted on a pair of wheels.

To enable others to make and use our invention, we will now proceed to describe its construction and operation.

$a$ represents a central post, supported by the lugs $b\ b$, which are stepped in the axle $c$. A cross-arm, $d$, is pivoted at its centre, at the top of the post $a$, in such manner as to rotate freely. At the ends of the arm $d$ are sheaves $e$, over which pass ropes $h$, to the outer ends of which are attached the forks $i$. The inner ends of the ropes $h$ are fastened to the windlasses $k$, placed one at the lower end of each of the lugs $b\ b$. The windlasses are provided with cranks $l$. The usual arrangement of thills, whiffle-tree, &c., is provided for the attachment of a horse to the apparatus. A driver's seat, $m$, is placed on the axle between the lugs $b$.

This machine having been drawn near a cock or cocks of hay, the latter are taken up by the forks, operated by one or more attendants, through the mechanism of the crank and windlasses. The forks having received their loads, pawls on the pulley-frames are put in connection with ratchets on the cranks, and the loads thus securely held during transportation. Arrived at the stack the loads may be easily and promptly transferred thereto.

Having thus fully described our invention, what we claim as new, and desire to secure by Letters Patent, is—

The shaft $a$, supported by standards $b$ upon the carriage $c$, and having at its top the revolving cross-piece $d$, with sheaves $e$, over which latter pass ropes $h$, attached to windlasses $k$ and forks $i$, the whole being constructed and arranged as and for the purpose described.

J. FORSHEE,
J. C. McCLAND.

Witnesses:
W. T. COONEY,
H. H. MARSHALL.